United States Patent
Heimlicher et al.

(10) Patent No.: US 10,362,022 B2
(45) Date of Patent: Jul. 23, 2019

(54) SYSTEM AND METHOD FOR FACILITATING MULTI-CONNECTION-BASED AUTHENTICATION

(71) Applicant: UBS Business Solutions AG, Zurich (CH)

(72) Inventors: Simon Heimlicher, Zurich (CH); Alain Hiltgen, Birmensdorf (CH)

(73) Assignee: UBS Business Solutions AG, Zurich (CH)

( * ) Notice: Subject to any disclaimer, the term of this patent is extended or adjusted under 35 U.S.C. 154(b) by 181 days.

(21) Appl. No.: 15/486,786

(22) Filed: Apr. 13, 2017

(65) Prior Publication Data
US 2018/0302226 A1 Oct. 18, 2018

(51) Int. Cl.
H04L 29/06 (2006.01)
H04L 9/32 (2006.01)
G06F 21/44 (2013.01)

(52) U.S. Cl.
CPC .......... H04L 63/0823 (2013.01); G06F 21/44 (2013.01); H04L 9/3215 (2013.01); H04L 9/3271 (2013.01); H04L 63/0442 (2013.01); H04L 63/061 (2013.01); H04L 63/123 (2013.01); H04L 63/18 (2013.01); *G06F 2221/2103* (2013.01); *H04L 2463/082* (2013.01)

(58) Field of Classification Search
None
See application file for complete search history.

(56) References Cited

U.S. PATENT DOCUMENTS

| | | | |
|---|---|---|---|
| 7,444,513 B2 * | 10/2008 | Nyman | H04L 63/0407 380/247 |
| 8,397,059 B1 | 3/2013 | Ferguson | |
| 9,172,699 B1 * | 10/2015 | Vazquez | H04L 63/0861 |
| 2002/0095507 A1 | 7/2002 | Jerdonek | |
| 2005/0132195 A1 * | 6/2005 | Dietl | G06F 21/64 713/176 |
| 2006/0047606 A1 * | 3/2006 | Yach | G06F 21/42 705/76 |

(Continued)

OTHER PUBLICATIONS

European Patent Office Extended European Search Report dated Aug. 24, 2018 for related European Patent Application No. EP18167026.6 filed Apr. 12, 2018 claiming priority to U.S. Appl. No. 15/486,786.

*Primary Examiner* — Benjamin E Lanier
(74) *Attorney, Agent, or Firm* — Pillsbury Winthrop Shaw Pittman, LLP

(57) ABSTRACT

In certain embodiments, first and second challenge responses may be obtained at a computer system from a client device respectively via first and second connections between the computer system and the client device. The challenge responses may each be generated based on a same private key stored in a secure local storage at the client device. Confirmation of identification information associated with an entity, to which the private key corresponds, may be obtained based on information obtained from the client device via the first connection. Information obtained from the client device via the second connection may be authenticated based on (i) the obtained confirmation via the first connection and (ii) verification of the first and second challenge responses obtained respectively via the first and second connections.

20 Claims, 10 Drawing Sheets

(56) References Cited

U.S. PATENT DOCUMENTS

| | | | |
|---|---|---|---|
| 2006/0206724 A1* | 9/2006 | Schaufele | G06F 21/32 |
| | | | 713/186 |
| 2009/0119754 A1 | 5/2009 | Schubert | |
| 2011/0197070 A1* | 8/2011 | Mizrah | H04L 63/0869 |
| | | | 713/176 |
| 2012/0144471 A1* | 6/2012 | Tsang | H04L 9/3226 |
| | | | 726/7 |
| 2013/0179681 A1* | 7/2013 | Benson | G06Q 20/38215 |
| | | | 713/155 |
| 2013/0227651 A1* | 8/2013 | Schultz | G06F 21/32 |
| | | | 726/4 |
| 2014/0052986 A1* | 2/2014 | Kanai | H04L 63/0428 |
| | | | 713/168 |
| 2016/0027006 A1* | 1/2016 | Billett, Jr. | G06Q 20/3278 |
| | | | 705/71 |
| 2016/0078215 A1* | 3/2016 | Robshaw | H04L 9/3215 |
| | | | 340/10.42 |
| 2016/0226835 A1 | 8/2016 | Hamburger et al. | |
| 2016/0248752 A1 | 8/2016 | Blinn | |
| 2016/0328545 A1 | 11/2016 | Chan et al. | |
| 2017/0053109 A1* | 2/2017 | Han | G06F 21/32 |
| 2017/0364911 A1* | 12/2017 | Landrok | G06Q 20/3825 |
| 2018/0063159 A1* | 3/2018 | Naughton-Green | H04L 9/08 |

* cited by examiner

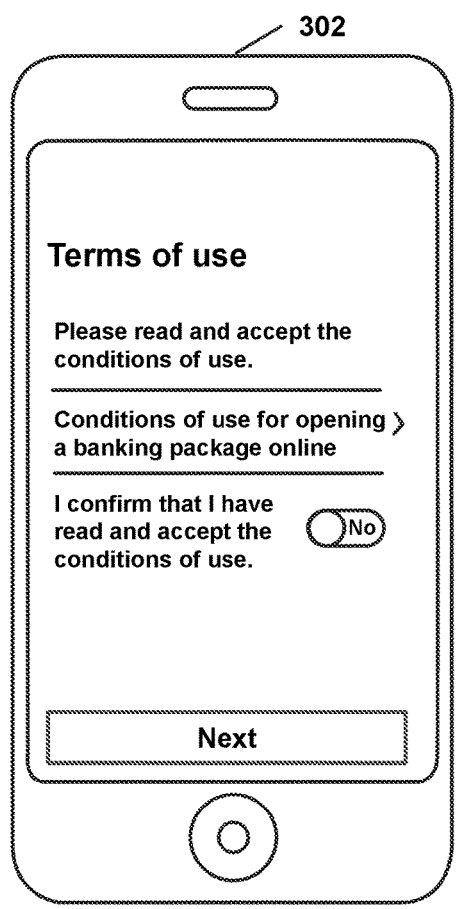
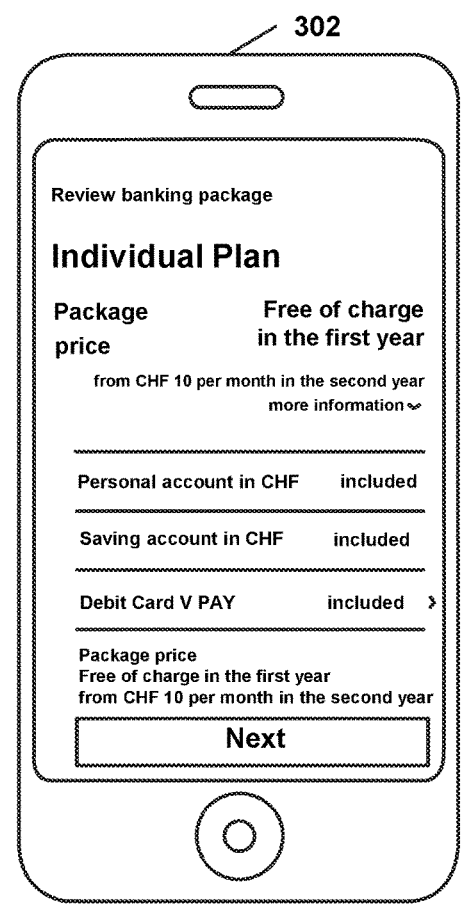
FIG. 3A                    FIG. 3B

SYSTEM AND METHOD FOR FACILITATING MULTI-CONNECTION-BASED AUTHENTICATION

FIELD OF THE INVENTION

The invention relates to computer-assisted authentication of information obtained via one or more connections.

BACKGROUND OF THE INVENTION

Due to the advent of computer technology, many companies and other entities are moving toward the use of electronic signature systems. Although typical electronic signature systems utilize digital certificates (e.g., trusted certificates) to create secure connections via one or more networks (e.g., to avoid a man-in-the-middle attack where an attacker acts as a prospective customer or other signer), such electronic signature systems may still be open to an attacker that obtains a certificate or accesses a prospective signer's client device (e.g., a prospective customer's or other prospective signer's client device). These and other drawbacks exist.

SUMMARY OF THE INVENTION

Aspects of the invention relate to methods, apparatuses, and/or systems for facilitating computer-assisted authentication of information obtained via one or more connections.

In some embodiments, first and second challenge responses may be obtained at a computer system from a client device respectively via first and second connections between the computer system and the client device. The challenge responses may each be generated based on a same private key stored in a secure local storage at the client device. In some embodiments, as part of the first challenge response or in addition to the first challenge response, a public key (corresponding to the private key stored at the client device) may be obtained from the client device via the first connection. Additionally, or alternatively, the same public key may be obtained from the client device via the second connection. Confirmation of identification information associated with an entity, to which the private key corresponds, may be obtained based on information obtained from the client device via the first connection. Information obtained from the client device via the second connection may be authenticated based on (i) the obtained confirmation via the first connection and (ii) verification of the first and second challenge responses obtained respectively via the first and second connections.

In some embodiments, the public key may be registered in a database in association with the confirmed entity based on (i) the obtained confirmation via the first connection and (ii) the verification of the first challenge response obtained via the first connection. In one use case, if an identifier associated with the public key or associated with the entity is obtained via the second connection, the identifier may be used to query the database to obtain the public key. Upon obtaining the public key, the public key may be used to verify the second challenge response obtained via the second connection. In another use case, the public key may be obtained via the second connection (e.g., as a public key candidate purporting to be a valid public key of a registered entity). The public key candidate may be checked against the database to determine whether a match exists (e.g., whether the stored public key matches the public key candidate), and, if so, the public key (or the public key candidate) may be used to verify the second challenge response obtained via the second connection. In this way, for example, the combination of the verification and the identity confirmation may provide the assurance that information obtained via one of the connections and/or information signed using the same private key (for generating at least a portion of each of the first and second challenge responses) are from the same entity having the confirmed identity.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIGS. 3A-3F illustrate screenshots of a user interface associated with a client application, in accordance with one or more embodiments.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
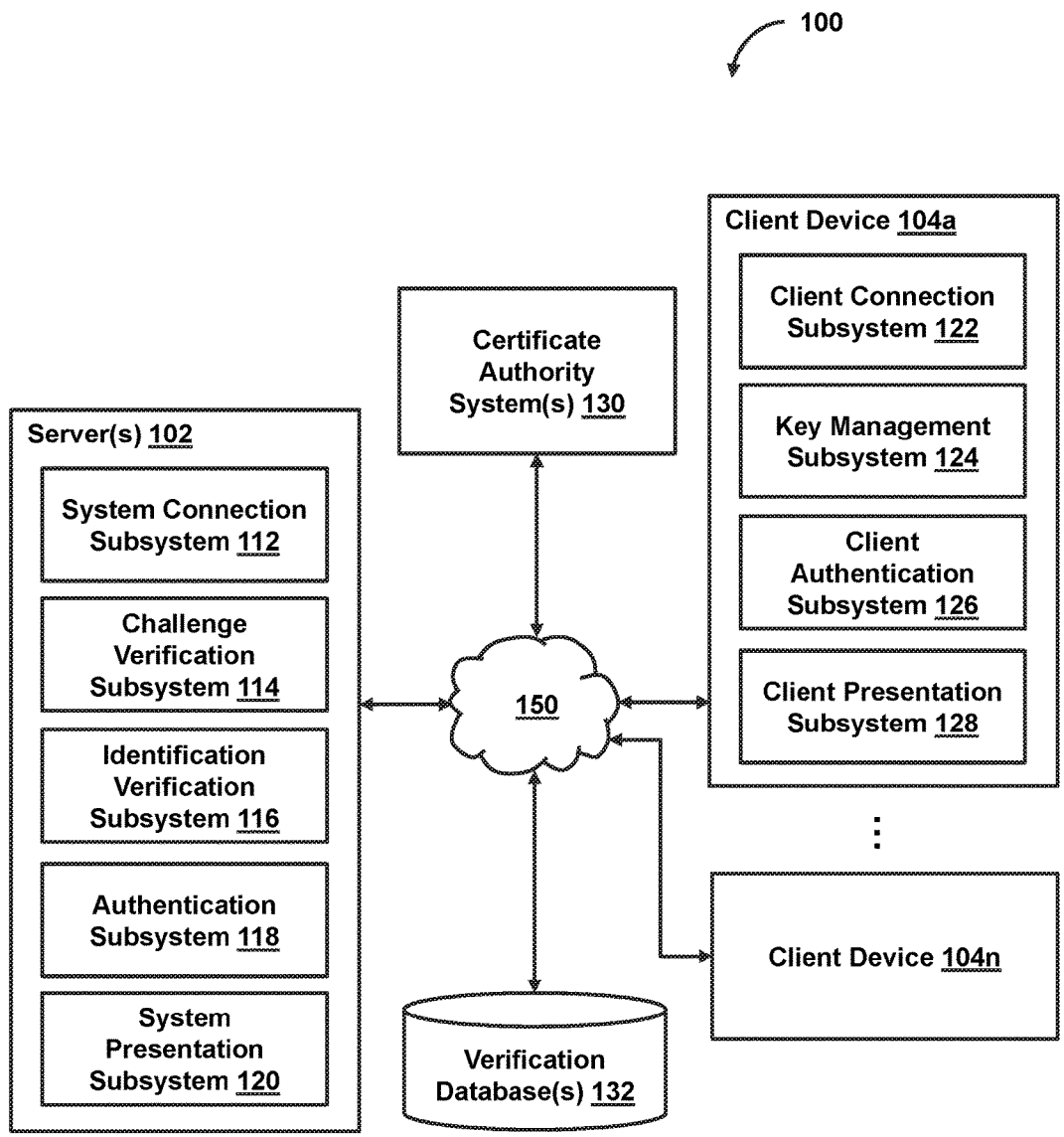
FIG. 1 shows a system for facilitating authentication of information obtained via one or more connections, in accordance with one or more embodiments.

FIG. 1 shows a system 100 for facilitating authentication of information obtained via one or more connections, in accordance with one or more embodiments. As shown in FIG. 1, system 100 may include server(s) 102, client device 104 (or client devices 104a-104n), or other components.

Server 102 may include system connection subsystem 112, challenge verification sub system 114, identification verification sub system 116, authentication sub system 118, system presentation subsystem 120, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. In some embodiments, client device 104 may include client connection subsystem 122, key management subsystem 124, client authentication subsystem 126, client presentation subsystem 128, or other components.

It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104. As another example, while one or more operations are described herein as being performed by components of client device 104, those operations may, in some embodiments, be performed by components of server 102.

In some embodiments, system 100 may facilitate multi-connection-based authentication. In some embodiments, system 100 may utilize certificates generated in accordance with the X.509 standard (i.e., X.509 certificates) or other certificate standards. In some embodiments, system 100 may generate certificates that do not necessarily follow common certificate standards. Although "first connection" and "second connection" are described herein between one component (e.g., client application of a client device) and another component (e.g., a computer system separate from the client device), it should be noted that, in some embodiments, more than two connections may be established between the two components (e.g., the client application and the separate computer system). In some embodiments, establishing a connection between two components involves the setting up of resources (e.g., computer memory and buffers, network resources, etc.) so that data may be transmitted from one of the components to the other one of the components.

Multiple-Connection-Based Authentication

In some embodiments, server 102 and client device 104 may establish a first connection between server 102 and client device 104. Server 102 may obtain a first challenge response from client device 104 via the first connection and perform verification of the first challenge response (e.g., via public-key-based verification, signature verification, certificate-based verification, or other techniques as described herein). As an example, server 102 may present a question (e.g., the challenge) to which client device 104 must provide a valid answer (e.g., the response). In one use case, the challenge-response protocol used by server 102 may include password authentication, where the challenge is asking for the password and the valid response is the correct password. In another use case, the challenge-response protocol used by server 102 may include the use of a cryptographic nonce as the challenge to ensure that every challenge-response sequence is unique (e.g., to protect against man-in-the-middle attacks, subsequent replay attacks, etc.). For example, a strong cryptographically secure pseudorandom number generator and cryptographic hash function can generate challenges that are highly unlikely to occur more than once.

In some embodiments, server 102 may obtain certain information from client 104 via the first connection to confirm that a user of client device 104 is who the user purports to be. As an example, the obtained information may include a real-time video stream via the first connection (e.g., a video connection) of the user (e.g., the user's face, eyes, or other aspect of the user), and the video stream may be utilized to confirm the identity of the user (e.g., via facial recognition or other automated recognition techniques, manual recognition or comparison by an administrator or personnel, or other techniques). As another example, the obtained information may include a real-time audio/video stream of one or more words or phrases spoken by the user (e.g., that the user is requested to speak). The requested words or phrases may, for instance, be randomly generated during the first connection and presented to the user to speak (e.g., to avoid pre-recording of the individual speaking such words or phrases or other reasons), and the audio/video stream may be processed by a voice identification subsystem to identify the speaker in the audio/video stream (e.g., to identify the speaker as the user). As another example, the obtained information may include one or more answers to one or more verification questions provided to client device 104 during the first connection. The questions may, for instance, be randomly generated (e.g., randomly selected from a set of questions) during the first connection and presented at client device 104 to solicit the answers from the user of the client device (e.g., answers or combination of answers generally only known by the user).

In some embodiments, in addition to the first connection, server 102 and client device 104 may establish a second connection between server 102 and client device 104. Server 102 may obtain a second challenge response from client device 104 via the second connection and perform verification of the second challenge response (e.g., via public-key-based verification, signature verification, certificate-based verification, or other techniques as described herein). In some embodiments, server 102 may authenticate information obtained from the client device based on (i) a confirmation of identification information associated with an entity (e.g., a user of client device 104), (ii) the verification of the first challenge response, (iii) the verification of the second challenge response, or (iii) other information. As an example, the verification of both the first challenge response and second challenge response may provide an assurance that both the first connection and the second connection are from the same entity (e.g., the same user of client device 104), and the confirmation of the identity of the entity (e.g., based on information obtained via one of the connections) may provide an assurance that the entity is who the entity purports to be (e.g., in its identification information that it provides via one of the connections or other connections). In this way, for example, the combination of the verification and the identity confirmation may provide the assurance that information obtained via one of the connections and/or information signed using the same private key (for generating at least a portion of each of the first and second challenge responses) are from the same entity having the confirmed identity.

In some embodiments, a video connection may be established between client device 104 (e.g., of a prospective customer) and server 102. From client device 104 via the video connection, server 102 may obtain a video recording (e.g., a video stream or other video recording) that includes video frames of a prospective customer's face (e.g., obtained via a camera of client device 104). The video frames of the prospective customer's face may be compared against a government-issued photo identification card (or other approved reference photo) included in the same video stream or obtained via one or more other sources (e.g., a client device of an administrator or other authorized personnel with the prospective customer). If the prospective customer's face in the videos frames matches the reference photo, the reference photo and/or its associated information (e.g., name or other identification information on the identification card) may be confirmed as belonging to the prospective customer. In some embodiments, server 104 may issue a first challenge to client device 104 via the video connection, and, in response, server 102 may obtain a first challenge response from client device 104. Server 102 may perform verification of the first challenge response and, upon determining that the first challenge response is a valid response (e.g., via one or more verification techniques described herein), server 102 may register a public key (corresponding to a private key used to generate the first challenge response) or other information (e.g., user ID, non-PII identifier, or other customer-related identifier or information) in one or more databases (e.g., verification database 132 or other databases) in association with the prospective customer. Based on the confirmed identification information and the verification of the first challenge response, server 102 may authenticate information obtained via another connection (e.g., signing connection) when a valid challenge response obtained via the other connection identifies the challenge response as being from the same entity. As an example, if a public key was registered during the video connection, the same public key may be used to verify subsequent challenge responses purporting to be from the same prospective customer. As another example, if a user ID or other identifier was registered during the video connection, the user ID (or other identifier) may be used to obtain the public key, which can then be used to verifying subsequent challenge response purporting to be from the same prospective customer.

In some embodiments, with respect to first and second connections between server 102 and client device 104, server 102 may obtain a first certificate from client device 104 via the first connection and perform verification of the first certificate (e.g., via signature verification, certificate match verification, or other techniques as described herein), and obtain a second certificate from client device 104 via the second connection and perform verification of the second certificate (e.g., via signature verification, certificate match verification, or other techniques as described herein). In some embodiments, server 102 may authenticate information obtained from the client device based on (i) a confirmation of identification information associated with an entity (e.g., a user of client device 104), (ii) the verification of the first certificate, (iii) the verification of the second certificate, or (iv) other information. In some embodiments, the first and second certificates may be provided by client device 104 to server 104 as at least part of the first and second challenge responses. The verification of both the first certificate and second certificate may, for example, provide an assurance that both the first connection and the second connection are from the same entity (e.g., the same user of client device 104), and the confirmation of the identity of the entity (e.g., based on information obtained via one of the connections) may provide an assurance that the entity is who the entity purports to be (e.g., in its identification information that it provides via one of the connections or other connections).

Figure 2:
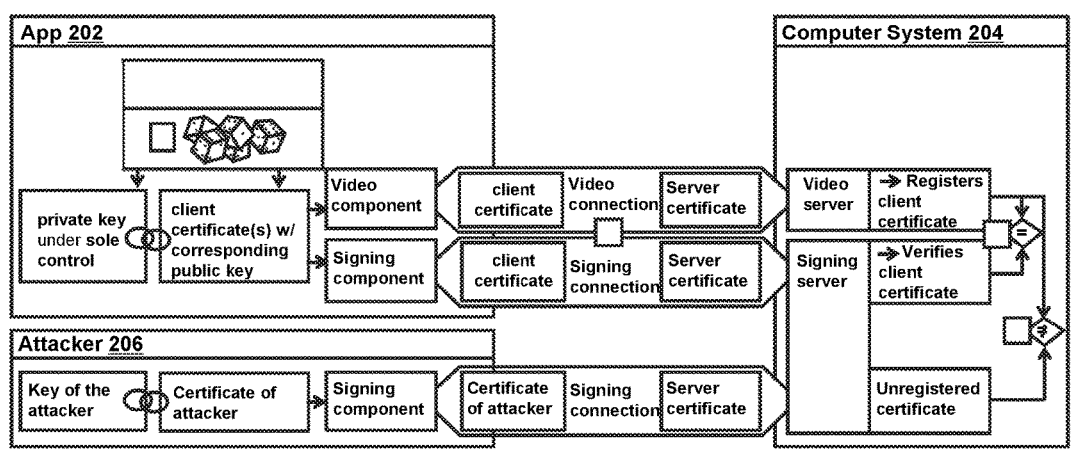
FIG. 2 shows a diagram illustrating interactions between a client application and a computer system to facilitate authentication of information obtained via one or more connections, in accordance with one or more embodiments.

In one use case, with respect to FIG. 2, a video connection may be established between client application 202 (e.g., of client device 104 of a prospective customer) and computer system 204 (e.g., an authentication system, a customer on-boarding system, etc.). From client application 202 via the video connection, computer system 204 may obtain a video recording (e.g., a video stream or other video recording) that includes video frames of a prospective customer's face (e.g., obtained via a camera of client device 104). The video frames of the prospective customer's face may be compared against a government-issued photo identification card (or other approved reference photo) included in the same video stream or obtained via one or more other sources (e.g., a client device of an administrator or other authorized personnel with the prospective customer). If the prospective customer's face in the videos frames matches the reference photo, the reference photo and/or its associated information (e.g., name or other identification information on the identification card) may be confirmed as belonging to the prospective customer.

In addition, further with respect to FIG. 2, client application 202 and computer system 204 may exchange first client and server certificates via the video connection. Client application 202 may perform verification of the first server certificate. As an example, client application 202 may initially perform verification of the first server certificate (e.g., to ensure that the computer system 204 is a trusted system) and, upon determining that the first server certificate is a valid certificate (e.g., of a trusted system), client application 202 may initiate the transmission of the video recording that includes video frames of the prospective client's face. Computer system 204 may perform verification of the first client certificate and, upon determining that the first client certificate is a valid certificate (e.g., of a trusted system), computer system 204 may register one or more portions of the first client certificate and store the registered portions of the first client certificate in one or more databases (e.g., verification database 132 or other databases). Based on the confirmed identification information and the verification of the first client certificate (e.g., as a valid certificate), computer system 204 may authenticate information obtained via another connection (e.g., signing connection) when a valid client certificate (determined to correspond to the same entity) is also received via the other connection.

In a further use case, with respect to FIG. 2, a signing connection may be established between client application 202 and computer system 204 (e.g., before the video connection is established, during the video connection, or after the video connection is terminated). Client application 202 and computer system 204 may exchange second client and server certificates via the signing connection. Client application 202 may perform verification of the second server certificate (e.g., prior to transmitting confidential information or other information to computer system 204). Computer system 204 may perform verification of the second client certificate. The verification of the second client certificate may include determining whether one or more portions of the second certificate matches one or more corresponding portions of the registered first client certificate. As an example, computer system 204 may determine whether one or more of the first certificate's message, digital signature, or other portion matches the corresponding one or more of the second certificate's message, digital signature, or other portion. In one use case, with respect to each certificate, the digital signature may include the message hash, the public key, hash function information (e.g., hash function identifier indicating the hash function), or other information. The other portion may include the public key and/or the hash function information (e.g., if the digital signature does not include the public key and/or the hash function information) or other information. As another example, upon determining that the two certificates' public keys are the same, computer system 204 may perform signature verification of the second certificate using the matching public key to determine whether the second certificate is valid. If determined to be valid (and further based on the foregoing confirmation and the first client certificate verification), computer system 204 may determine that the second certificate is from the same confirmed prospective customer (reflected in the video frames transmitted over the video connection).

Further with respect to FIG. 2, based on the matching certificates (or portions thereof) and/or the verification of the second certificate using the matching public key, computer system 204 may authenticate information obtained via the signing connection as being from the same confirmed prospective customer (reflected in the video frames transmitted over the video connection). In some cases, the authenticated obtained information may be transmitted as part of the second client certificate (e.g., as at least part of the second client certificate's message that is signed by a private key to generate the second client certificate's digital signature). In some cases, the authenticated obtained information may be other information (not included in the second client certificate) transmitted via the signing connection. In some cases, such other information (transmitted via the signing connection) may also be signed using a private key to generate a digital signature to verify the integrity of the transmitted information.

Same-Key-Generated Challenge Responses

In some embodiments, client device 104 may generate or obtain a public/private key pair and store the public/private key pair in local storage at client device 104. To answer challenges, client device 104 may generate one or more challenge responses based on the private key, the public key, or other information. As an example, client device 104 may generate a challenge response by using the private key to sign a message to generate a digital signature for the message and combining the message, the digital signature, or other information to create the challenge response (e.g., where the challenge response includes the digital signature but not the message, where the challenge response includes both the message and the digital signature, etc.). As a further example, the message may be provided as input to a hash function to generate a hash. The private key may be used to encrypt the hash. The encrypted hash, the public key, or other information may be combined to generate the digital signature (e.g., where the digital signature includes the encrypted hash but not the public key, where the digital signature includes both the encrypted hash and the public key, etc.). As another example, client device 104 may obtain a randomly-generated message as part of a challenge where client device 104 is asked to send back a challenge response that includes a valid encrypted version of the message (e.g., by encrypting the message with the private key of the public/private key pair so that the message can be decrypted using the public key of the public/private key pair to verify the challenge response). The same private key may be used to generate multiple response challenges transmitted over multiple connections between client device 104 and one or more other components of system 100 to provide assurance to the other components that their respective connections are with the bearer of the private key.

In some embodiments, at least the private key may be stored in a secure local storage at client device 104 (e.g., a secure memory within a cryptographic processor of client device 104 or other secure local storage at client device 104). Given an appropriate key size (and assuming client device 104 is configured such that the private key does not leave client device 104), it would be computationally infeasible for an attacker to brute-force the private key. In some embodiments, at least the private key may be stored in a volatile memory (e.g., a volatile memory portion of a secure memory of client device 104 or other volatile storage of client device 104). In one use case, the volatile memory may be associated with a client application hosted at client device 104 such that termination of the client application (e.g., closing the client application) or an active application session thereof causes the private key and/or other information stored at the volatile memory to be overwritten (e.g., with random data or other data), deleted, or cleared. As an example, upon termination of the application session (e.g., due to manual closing of the client application, inactivity exceeding an inactivity threshold period, etc.), the volatile memory may be unpowered, causing the volatile memory to be cleared. In some cases, the volatile memory may be unpowered while the client application is still running, while other components of client device 104 remain powered, etc. In this way, for example, the duration during which valid challenge responses from the bearer of the same private key can be generated is limited to a given application session (e.g., to further improve key and/or application security).

In some embodiments, client device 104 may generate one or more certificates based on a private key of a public/private key pair, a public key of the public/private key pair, or other information. Client device 104 may provide such a certificate (i) as a challenge response to a challenge issued by server 102, (ii) as part of a process to authenticate a connection as a trusted connection, or (iii) part of other processes. As an example, client device 104 may generate a certificate by using the private key to sign a message to generate a digital signature for the message and combining the message, the digital signature, or other information to create the certificate. As a further example, the message may be provided as input to a hash function to generate a hash. The private key may be used to encrypt the hash. The encrypted hash, the public key, or other information may be combined to generate the digital signature (e.g., the digital signature may include the encrypted hash and the public key). The same private key may be used to generate multiple certificates transmitted over multiple connections between client device 104 and one or more other components of system 100 to provide assurance to the other components that their respective connections are with the bearer of the private key.

In some embodiments, client device 104 may obtain a private key (e.g., of a public/private key pair) generated by a certificate authority system (e.g., certificate authority system 130), and client device 104 may generate one or more certificates based on the obtained private key. In some embodiments, the private key may be stored on a secured physical token (e.g., a secured USB token or other secured physical token) by the certificate authority system, and physically delivered to a certificate authority site, a prospective customer site, or other location for attachment to client device 104. In some embodiments, the private key may be transferred from the secured physical token to an internal storage within client device 104 (e.g., an internal secured memory location within client device 104 or other internal storage). In some embodiments, a public key (corresponding to the private key) may be obtained by client device 104 in the same or similar manner as the private key. In some embodiments, client device 104 may generate the public key from the private key using one or more techniques.

In some embodiments, client device 104 may obtain a private key (e.g., of a public/private key pair) by generating the private key, and client device 104 may generate one or more certificates based on the generated private key. In some embodiments, a client application of client device 104 may host a local secret at a local storage of client device 104 (e.g., a secure memory within a cryptographic processor of client device 104 or other secure memory at client device 104). The client application may use the local secret to generate the public/private keys and store the public/private keys at the local storage of client device 104.

Computer-Assisted Authentication Using Subsystems 112-128

In some embodiments, system connection subsystem 112 and/or client connection subsystem 122 may cause one or more connections to be established between client devices, servers, or other components of system 100 over one or more networks (e.g., the Internet, other wide area network, or other networks). In some embodiments, multiple connections may be established between (i) a client application of a client device and (ii) a computer system (e.g., an authentication system, a customer on-boarding system, etc.) that are remote from one another. In some embodiments, multiple connections may be established between the client application and the computer system during the same application session of the client application. As an example, multiple connections of different connection types may be established during a single application session. Upon termination of the session, all the connections established during the session may be caused to be terminated. In one scenario, as indicated in FIG. 2, a video connection and a signing connection may be established between client application 202 (e.g., of client device 104) and computer system 204 over the Internet during an active session of client application 202. In a further scenario, one of the connections may be initially established, and the other one of the connections may be established while the initially-established connection continues to be active or otherwise maintained between client application 202 and computer system 204. In another scenario, one of the connections may be initially established, but then disconnected before the other one of the connections is established.

In some embodiments, key management subsystem 124 may obtain a private key (e.g., from a local storage of a client device). Client authentication subsystem 126 may generate one or more challenge responses based on the private key. As an example, a question (e.g., the challenge) may be presented to which a valid answer (e.g., the response) is to be provided. In one use case, the challenge-response protocol may include password authentication, where the challenge is asking for the password and the valid response is the correct password. In another use case, the challenge-response protocol may include the use of a cryptographic nonce as the challenge to ensure that every challenge-response sequence is unique (e.g., to protect against man-in-the-middle attacks, subsequent replay attacks, etc.). For example, a strong cryptographically secure pseudorandom number generator and cryptographic hash function can generate challenges that are highly unlikely to occur more than once. A randomly-generated message may, for instance, be issued as part of a challenge where a challenge response that includes a valid encrypted version of the message must be obtained to validly answer the challenge. The challenge response may include an encrypted version of the message that was encrypted using the private key. In this way, the encrypted message can be decrypted using a public key (that corresponds to the private key) to verify the challenge response.

In some embodiments, client authentication subsystem 126 may generate one or more certificates based on the private key. As an example, client authentication subsystem 126 may generate a certificate to include a digital signature or other information (e.g., certificate authority identifier, identifier of the sender of a message verifiable using the digital signature, or other information). In one use case, with respect to each of multiple certificates generated by client authentication subsystem 126, the sender's message may be provided as an input to a particular hash function to generate a hash of the message. The hash may be encrypted using the private key. The encrypted hash may be combined with other information (e.g., a corresponding public key corresponding to the private key or other information) to generate the digital signature of the certificate. In this way, for instance, each of the digital signatures may be verified by another component of system 100 using the same public key. For example, with respect to each certificate, challenge verification subsystem 114 may provide the sender's message as input to the same hash function to generate a hash for verification. Challenge verification subsystem 114 may perform signature verification of the certificate by using the same public key to decrypt the encrypted hash of the certificate and comparing the verification hash with the decrypted hash. If the verification hash matches the decrypted hash (e.g., they are the same), then the digital signature (and the certificate) may be determined to be valid.

Figure 3C:
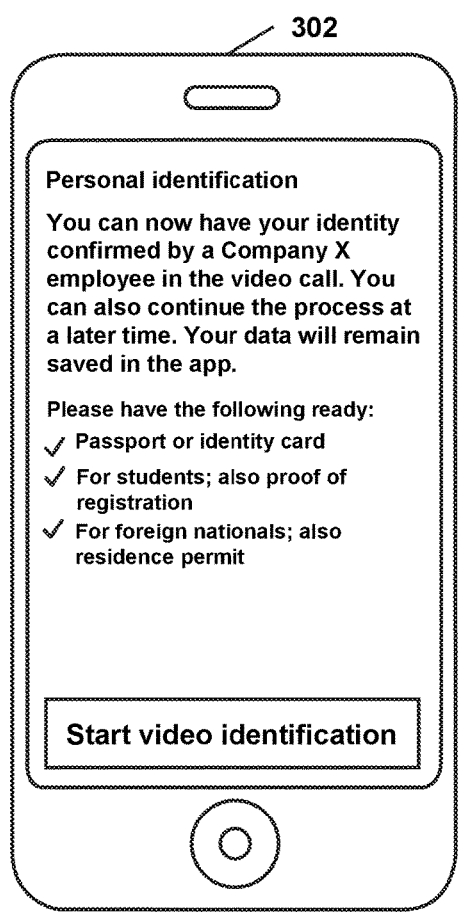

In some embodiments, identity verification subsystem 116 may work with system presentation subsystem 120 (and/or client presentation subsystem 128) to confirm identification information associated with an entity, such as a prospective customer, other individual, or other entity. As an example, with respect to FIGS. 3A-3F, system presentation subsystem 120 and/or client presentation subsystem 128 may generate and present a user interface on mobile device 302 to facilitate a prospective customer's on-boarding process. In one use case, with respect to FIGS. 3A-3C, a signing connection may be established between mobile device 302 and a remote on-boarding computer system (e.g., computer system comprising server(s) 120) via which the prospective customer (e.g., the user of mobile device 302) interacts with the user interface. As shown in FIG. 3C, the prospective customer may initiate the video identification process by selecting (e.g., via clicking, tapping, holding, sliding, etc.) the "Start video identification" area of the user interface, which may cause a video connection to be established between mobile device 302 and the remote on-boarding computer system.

In a further use case, identity verification subsystem 116 may obtain a real-time video stream of the prospective customer via the video connection and perform facial recognition or other automated recognition techniques (e.g., eyes, voice, or other aspects) on video frames that includes the prospective customer's face or other aspect of the prospective customer. Upon determining that the prospective customer shown (or heard) in the video frames matches a trusted reference photo or other recording (e.g., video recording, audio recording, etc.), identity verification subsystem 116 may automatically confirm the identity of the prospective customer (e.g., as being the same individual that is associated with the trusted reference recording). In another use case, the trusted reference recording may include an approved government-issued passport or identification card (or other reference recording) against which the video frames may compare. In some cases, the government-issued passport or identification card (or other reference recording) may be checked by a company administrator or other personnel (who is physically with the prospective customer) to ensure that the passport or identification card is valid, and then streamed via the video connection (along with the video frames showing the prospective customer) to the remote on-boarding computer system for use in confirming the identity of the prospective customer. In some cases, an administrator or other personnel at the remote on-boarding computer system may compare the video frames showing the prospective customer and the government-issued passport or identification card (and/or perform other processes, e.g., as described herein) to determine whether there is a match. Upon determining a match, the administrator may activate (e.g., by clicking, tapping, holding, sliding, etc.) a button or other menu item that indicates that the administrator has confirmed the identity of the prospective customer. This activation may cause identity verification subsystem to obtain the confirmation of the identity of the prospective customer (e.g., as matching the identification information shown in the passport or identification card, identification provided as part of the certificate or provided separately from the certificate, etc.).

In some embodiments, challenge verification subsystem 114 may obtain a challenge response from mobile device 302 via the signing connection and perform verification of the signing-connection challenge response (e.g., public-key-based verification, signature verification, certificate-based verification, or other techniques as described herein). In some embodiments, challenge verification subsystem 114 may obtain a challenge response from mobile device 302 via the video connection and perform verification of the video-connection challenge response (e.g., public-key-based verification, signature verification, certificate-based verification, or other techniques as described herein). In one use case, upon obtaining a confirmation of the identity of a prospective customer based on information obtained via the video connection (e.g., where the obtained information includes a video stream of the prospective customer and a government-issued identification card or other identification information), authentication subsystem 118 may register a public key (corresponding to a private key used to generate both the signing-connection challenge response and the video-connection challenge response) or other information (e.g., user ID, non-PII identifier, or other customer-related identifier or information) in one or more databases (e.g., verification database 132 or other databases) in association with the prospective customer. The public key or other registered information may, for instance, be obtained via the signing connection, the video connection, or other connection from mobile device 302 or via other approaches. Based on the confirmed identification information and the verification of the video-connection challenge response (e.g., as a valid challenge response), authentication subsystem 118 may authenticate information obtained via the signing connection when a valid challenge response (e.g., the signing-connection challenge response) is obtained via the signing connection. As an example, if challenge verification subsystem 114 issues a randomly-generated message with the challenge to provide a valid encrypted version of the message, challenge verification subsystem 118 may verify a challenge response (to this challenge) by using the registered public key to decrypt the encrypted message (of the challenge response). If the decrypted message matches the original randomly-generated message (i.e., the message was encrypted with the corresponding private key), the challenge response may be deemed to be valid. As such, authentication subsystem 118 may confirm that both the video-connection certificate and the signing-connection certificate were transmitted by the bearer of the private key. Accordingly, given that the identity of the prospective customer was already confirmed during the video connection, the confirmed identity may be inferred for the signing connection.

In some embodiments, with respect to FIGS. 3A-3B, challenge verification subsystem 114 may obtain a certificate from mobile device 302 via the signing connection and perform verification of the signing-connection certificate (e.g., signature verification, certificate match verification, or other techniques as described herein). In some embodiments, with respect to FIGS. 3C-3D, challenge verification subsystem 114 may obtain a certificate from mobile device 302 via the video connection and perform verification of the video-connection certificate (e.g., signature verification, certificate match verification, or other techniques as described herein). In one use case, upon obtaining a confirmation of the identity of a prospective customer based on information obtained via the video connection (e.g., where the obtained information includes a video stream of the prospective customer and a government-issued identification card or other identification information), authentication subsystem 118 may register one or more portions of the video-connection certificate and store the registered portions of the video-connection certificate in one or more databases (e.g., verification database 132 or other databases). Based on the confirmed identification information and the verification of the video-connection client certificate (e.g., as a valid certificate), authentication subsystem 118 may authenticate information obtained via the signing connection when a signing-connection-obtained valid client certificate (e.g., the signing-connection certificate) includes one or more given portions that match the video-connection certificate. As an example, if the signing-connection certificate has the same public key as the video-connection certificate, and signature verification of the signing-connection certificate using the same public key reveals that the signing-connection certificate is valid, then authentication subsystem 118 may determine that the same private key (used to generate the video-connection certificate) was also used to generate the signing-connection certificate. As such, authentication subsystem 118 may confirm that both the video-connection certificate and the signing-connection certificate were transmitted by the bearer of the private key. Accordingly, given that the identity of the prospective customer was already confirmed during the video connection, the confirmed identity may be inferred for the signing connection.

Figure 3D:
Figures 3E, 3F:
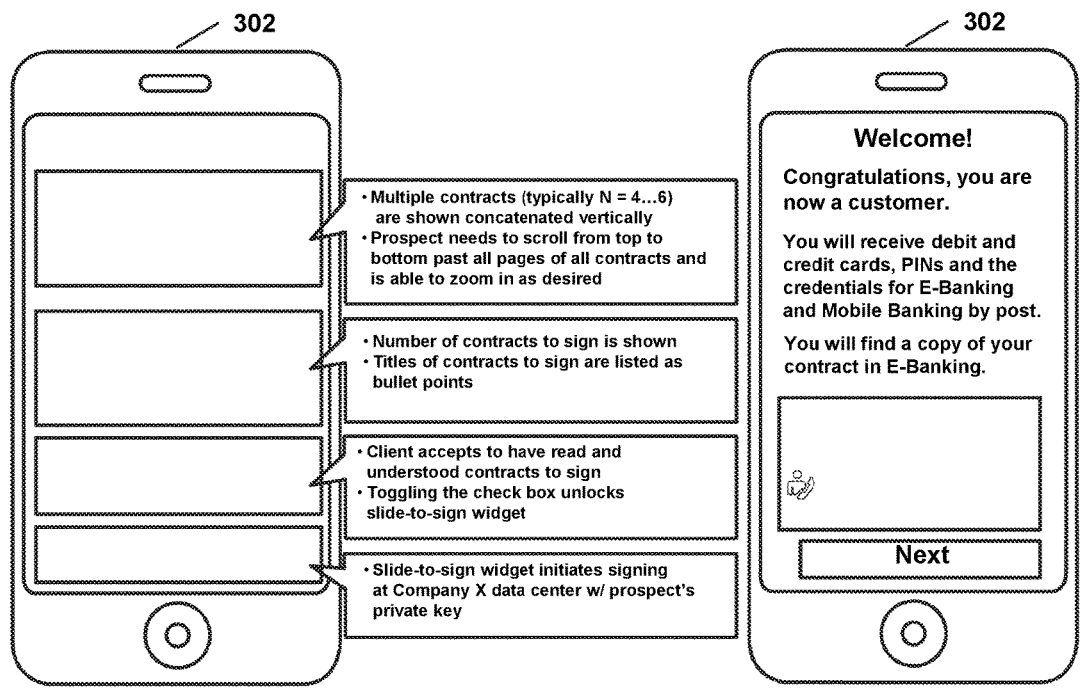

In some embodiments, with respect to FIGS. 3D-3F, the prospective customer may interact with the user interface of mobile device 302 to electronically sign contracts and agreements and transmit the electronic signature information to the remote computer system via the signing connection. Based on the confirmed identification information (via the video connection) and the verification of the two certificates (or two challenge responses) obtained via the video and signing connections, respectively) as being validly signed using the same private key, authentication subsystem 118 may authenticate the electronic signature information transmitted via the signing connection as being from the prospective customer.

Examples Flowcharts

FIGS. 4, 5, 6A, 6B, and 7 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 4:
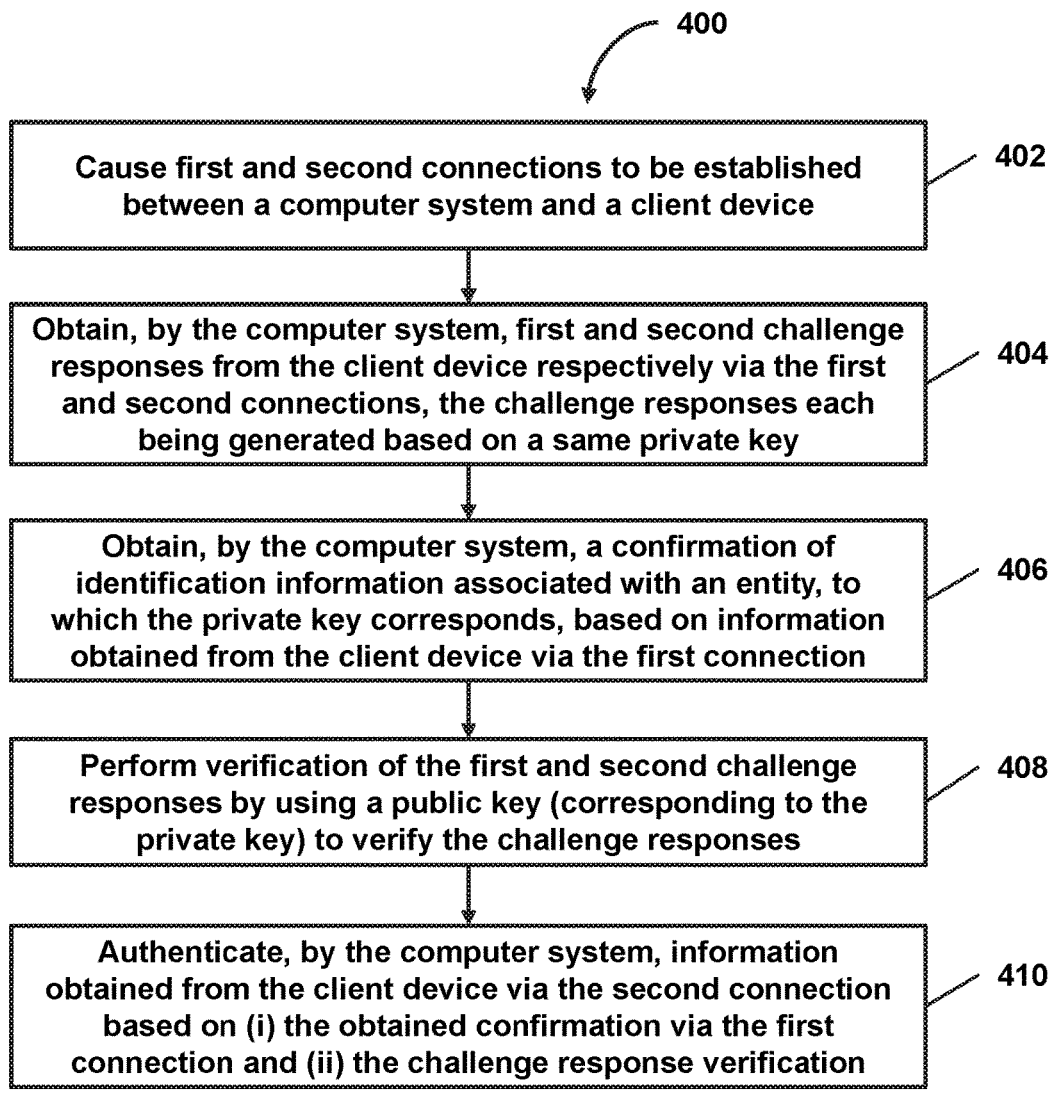
FIG. 4 shows flowcharts of a method of facilitating authentication via same-key-generated challenge responses over multiple connections, in accordance with one or more embodiments.

FIG. 4 shows a flowchart of a method 400 of facilitating authentication via same-key-generated challenge responses over multiple connections, in accordance with one or more embodiments. In an operation 402, first and second connections between a computer system and a client device may be established. In some embodiments, at least a portion of the first connection and a portion of the second connection overlap in time with one another. As an example, one of the connections may be initially established, and the other one of the connections may be established while the initially-established connection continues to be active or otherwise maintained between the computer system and the client device. In some embodiments, no portion of the first connection and the second connection overlaps in time with one another. As an example, one of the connections may be initially established, but then disconnected before the other one of the connections is established. Operation 402 may be performed by a system connection subsystem that is the same as or similar to system connection subsystem 112, in accordance with one or more embodiments.

In an operation 404, first and second challenge responses may be obtained by the computer system from the client device respective via the first and second connections. As an example, the first and second challenge responses may each be generated based on a same private key (e.g., a private key of a public/private key pair or other private key). In one use case, with respect to each challenge response, a randomly-generated message may be issued as part of a challenge where a challenge response that includes a valid encrypted version of the message must be obtained to validly answer the challenge. The challenge response may, for instance, include an encrypted version of the message that was encrypted using the private key. In this way, the encrypted message can be decrypted using a public key (that corresponds to the private key) to verify the challenge response. Operation 404 may be performed by a challenge verification subsystem that is the same as or similar to challenge verification subsystem 114, in accordance with one or more embodiments.

In an operation 406, a confirmation of identification information associated with an entity, to which the private key corresponds, may be obtained by the computer system based on information obtained from the client device via the first connection. The identification information may include a name of the entity (e.g., a name of an individual or other entity), a social security number of the entity, a passport number of the entity, a tax identification number of the entity (e.g., a social security number, an organization tax identification number, etc.), a birth date of the entity, an address of the entity, a photo or other rendering of the entity (e.g., an image or video of the individual or other entity), or other identification information. Operation 406 may be performed by an identification verification subsystem that is the same as or similar to identification verification subsystem 116, in accordance with one or more embodiments.

In some embodiments, with respect to operation 406, if the entity is an individual (e.g., a person), and the first connection is a video connection, the obtained information (on which the confirmation is based) may include a video of the individual's face or other aspect of the individual (e.g., eyes, fingerprints detectable on the individual's fingers, the individual's whole body, etc.) streamed to the computer system from the client device via the video connection. The video may be used to verify that the identification information reflects the individual shown in the video. In some embodiments, if the entity is an individual (e.g., a person), and the first connection is an audio or video connection, the obtained information (on which the confirmation is based) may include an audio recording of one or more words or phrases that the individual is requested to speak during the audio or video connection. The requested words or phrases may, for instance, be randomly generated during the audio or video connection and presented to the individual to speak (e.g., to avoid pre-recording of the individual speaking such words or phrases or other reasons), and the audio recording may be processed by a voice identification subsystem to identify the speaker in the audio recording (e.g., to identify the speaker as someone who is identified by the identification information). In some embodiments, the obtained information (on which the confirmation is based) may include one or more answers to one or more verification questions provided to the client device during the first connection. The questions may, for instance, be randomly generated (e.g., randomly selected from a set of questions) during the first connection and presented at the client device to solicit the answers from a user of the client device.

In an operation 408, verification of the first and second challenge responses may be performed by using a same public key (corresponding to the private key) to verify the first and second challenge responses. Operation 408 may be performed by a challenge verification subsystem that is the same as or similar to challenge verification subsystem 114, in accordance with one or more embodiments.

In an operation 410, information obtained from the client device via the second connection may be authenticated based on (i) the obtained confirmation via the first connection and (ii) the verification of the first and second challenge responses obtained respectively via the first and second connections. Operation 410 may be performed by an authentication subsystem that is the same as or similar to authentication subsystem 118, in accordance with one or more embodiments.

Figure 5:
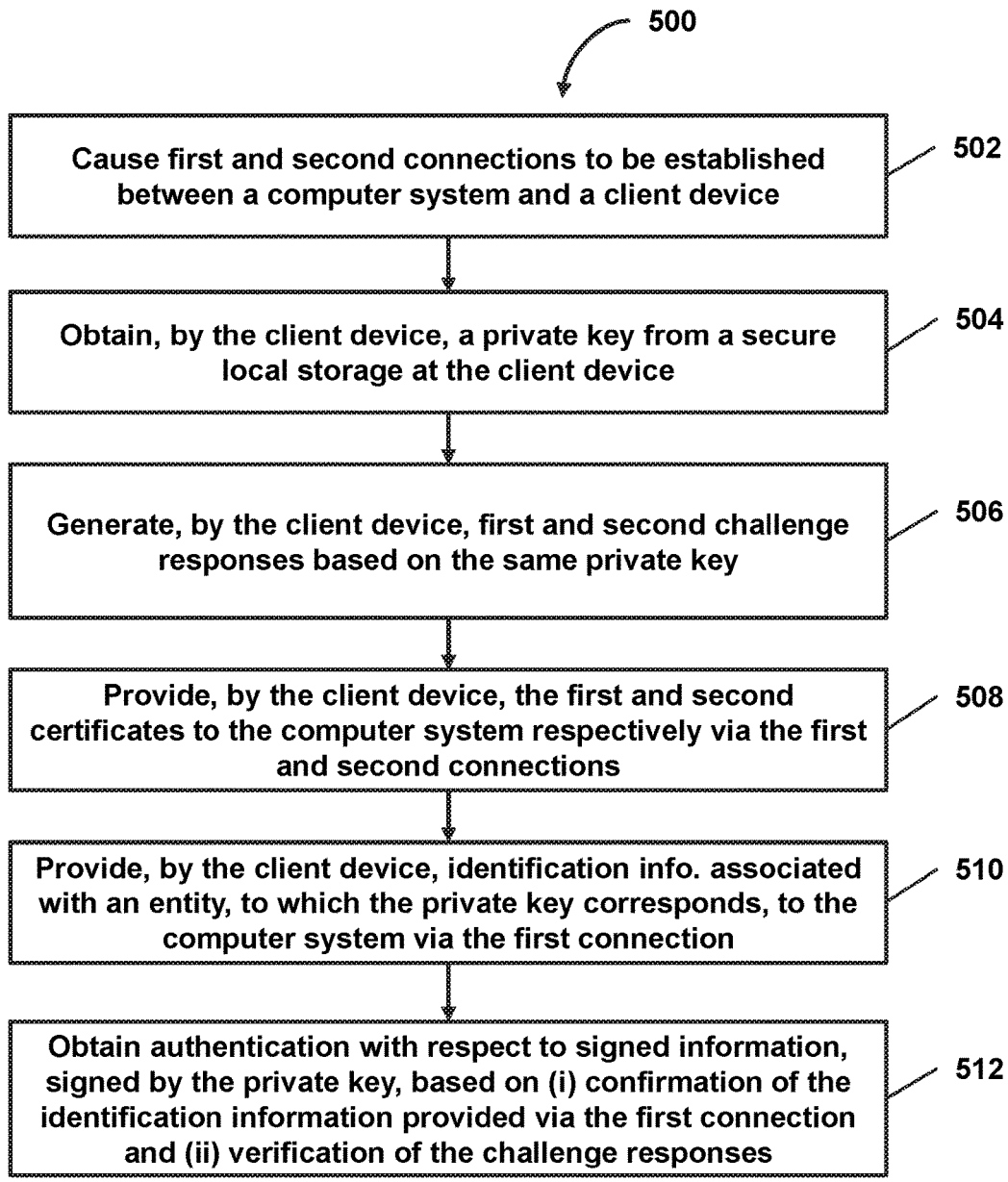
FIG. 5 shows a flowchart of another method of facilitating authentication via same-key-generated challenge responses over multiple connections, in accordance with one or more embodiments.

FIG. 5 shows a flowchart of a method 500 of facilitating authentication via same-key-generated challenge responses over multiple connections, in accordance with one or more embodiments. In an operation 502, first and second connections between a computer system and a client device may be established. In some embodiments, at least a portion of the first connection and a portion of the second connection overlap in time with one another. As an example, one of the connections may be initially established, and the other one of the connections may be established while the initially-established connection continues to be active or otherwise maintained between the computer system and the client device. In some embodiments, no portion of the first connection and the second connection overlaps in time with one another. As an example, one of the connections may be initially established, but then disconnected before the other one of the connections is established. Operation 502 may be performed by a client connection subsystem that is the same as or similar to client connection subsystem 122, in accordance with one or more embodiments.

In an operation 504, a private key may be obtained by the client device from a secure local storage at the client device. As an example, the private key may be stored in a secure memory within a cryptographic processor of the client device or other secure memory at the client device. In one use case, the private key may be stored in a volatile memory portion (of the client device's secure memory) that is associated with a client application hosted at the client device such that termination of the client application (e.g., closing the client application) or an active session thereof causes the private key and other information stored at the volatile memory portion associated with the client application to be overwritten (e.g., with random data or other data) or deleted. Operation 504 may be performed by a key management subsystem that is the same as or similar to key management subsystem 124, in accordance with one or more embodiments.

In an operation 506, first and second challenge responses may be generated by the client device based on the same private key. As an example, with respect to each challenge response, a randomly-generated message may be obtained as part of a challenge where a challenge response that includes a valid encrypted version of the message must be send back to the challenger to validly answer the challenge. To do so, for instance, the message may be encrypted using the private key so that the message can be decrypted using a public key (that corresponds to the private key) to verify the challenge response. Operation 506 may be performed by a client authentication subsystem that is the same as or similar to client authentication subsystem 126, in accordance with one or more embodiments.

In an operation 508, the first and second challenge responses may be provided by the client device to the computer system respectively via the first and second connections. The first challenge response may be provided by the client device to the computer system via the first connection at a first time. The second challenge response may be provided by the client device to the computer system via the second connection at a second time. Operation 508 may be performed by a client authentication subsystem that is the same as or similar to client authentication subsystem 126, in accordance with one or more embodiments.

In an operation 510, identification information associated with an entity, to which the private key corresponds, may be provided by the client device to the computer system via the first connection. The identification information may include a name of the entity (e.g., a name of an individual or other entity), a social security number of the entity, a passport number of the entity, a tax identification number of the entity (e.g., a social security number, an organization tax identification number, etc.), a birth date of the entity, an address of the entity, a photo or other rendering of the entity (e.g., an image or video of the individual or other entity), or other identification information. Operation 510 may be performed by a client connection subsystem that is the same as or similar to client connection subsystem 122, in accordance with one or more embodiments.

In an operation 512, authentication with respect to signed information (signed using the private key) may be obtained based on (i) confirmation of the identification information provided (by the client device to the computer system) via the first connection and (ii) verification of the first and second challenge responses. As an example, based on the confirmation and the challenge response verification, information signed using the same private key and provided to the computer system may be authenticated as coming from the entity (to which the private key corresponds). Operation 512 may be performed by an authentication subsystem that is the same as or similar to authentication subsystem 118, in accordance with one or more embodiments.

Figure 6A:
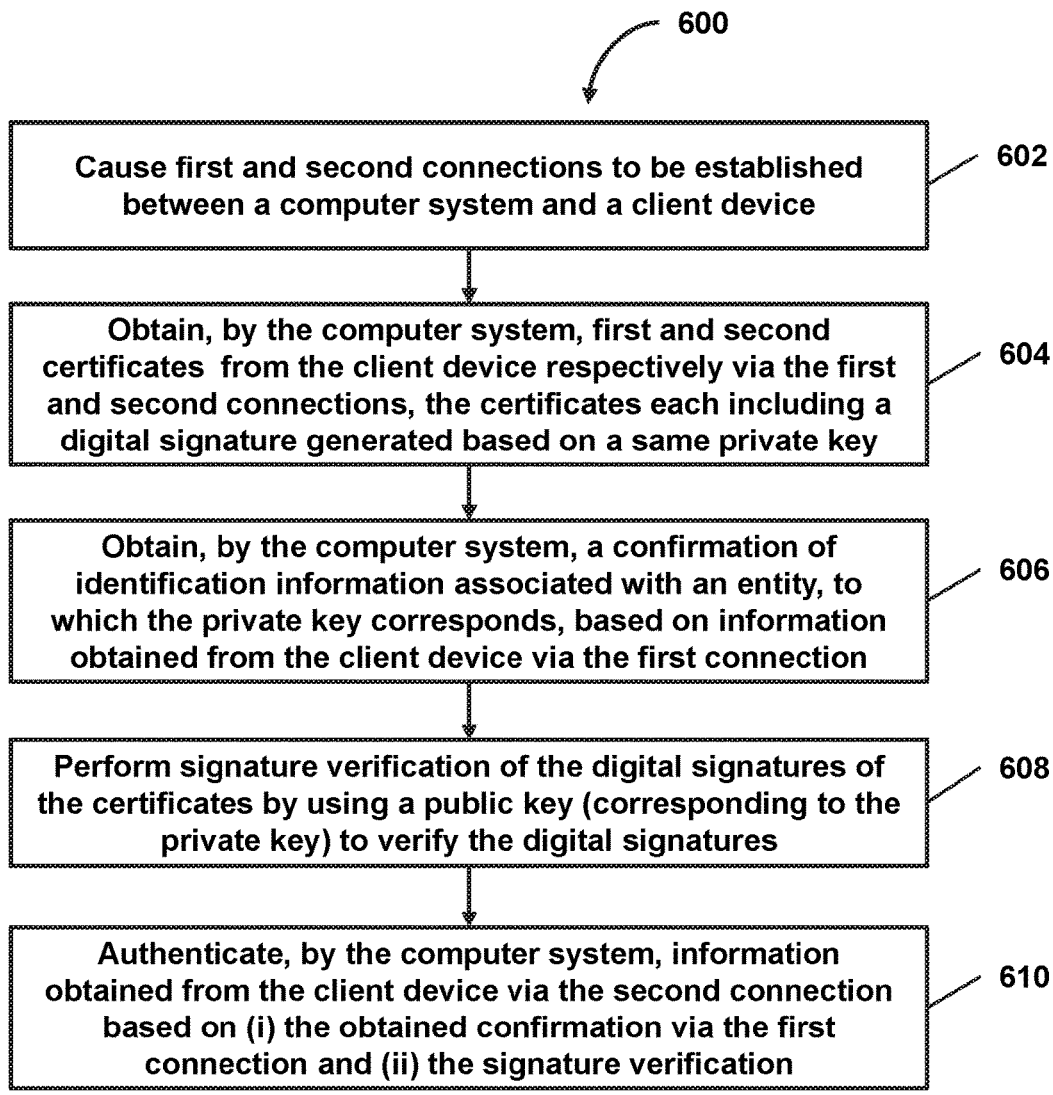
FIGS. 6A and 6B show flowcharts of methods of facilitating authentication via same-key-generated certificate transmission over multiple connections, in accordance with one or more embodiments.

FIG. 6A shows a flowchart of a method 600 of facilitating authentication via same-key-generated certificate transmission over multiple connections, in accordance with one or more embodiments. In an operation 602, first and second connections between a computer system and a client device may be established. In some embodiments, at least a portion of the first connection and a portion of the second connection overlap in time with one another. As an example, one of the connections may be initially established, and the other one of the connections may be established while the initially-established connection continues to be active or otherwise maintained between the computer system and the client device. In some embodiments, no portion of the first connection and the second connection overlaps in time with one another. As an example, one of the connections may be initially established, but then disconnected before the other one of the connections is established. Operation 602 may be performed by a system connection subsystem that is the same as or similar to system connection subsystem 112, in accordance with one or more embodiments.

In an operation 604, first and second certificates may be obtained by the computer system from the client device respective via the first and second connections. As an example, the first and second certificates may each include a digital signature generated based on a same private key (e.g., a private key of a public/private key pair or other private key). In one use case, the private key may be stored in a local storage at the client device (e.g., a secure memory within a cryptographic processor of the client device or other secure memory at the client device). In another use case, each of the first and second certificates may be generated by the client device based on the same private key (e.g., obtained from the client device's local storage) by using the private key to sign a message of the respective certificate to generate the digital signature of the respective certificate. Operation 604 may be performed by a challenge verification subsystem that is the same as or similar to challenge verification subsystem 114, in accordance with one or more embodiments.

In an operation 606, a confirmation of identification information associated with an entity, to which the private key corresponds, may be obtained by the computer system based on information obtained from the client device via the first connection. The identification information may include a name of the entity (e.g., a name of an individual or other entity), a social security number of the entity, a passport number of the entity, a tax identification number of the entity (e.g., a social security number, an organization tax identification number, etc.), a birth date of the entity, an address of the entity, a photo or other rendering of the entity (e.g., an image or video of the individual or other entity), or other identification information. Operation 606 may be performed by an identification verification subsystem that is the same as or similar to identification verification subsystem 116, in accordance with one or more embodiments.

In some embodiments, with respect to operation 606, if the entity is an individual (e.g., a person), and the first connection is a video connection, the obtained information (on which the confirmation is based) may include a video of the individual's face or other aspect of the individual (e.g., eyes, fingerprints detectable on the individual's fingers, the individual's whole body, etc.) streamed to the computer system from the client device via the video connection. The video may be used to verify that the identification information reflects the individual shown in the video. In some embodiments, if the entity is an individual (e.g., a person), and the first connection is an audio or video connection, the obtained information (on which the confirmation is based) may include an audio recording of one or more words or phrases that the individual is requested to speak during the audio or video connection. The requested words or phrases may, for instance, be randomly generated during the audio or video connection and presented to the individual to speak (e.g., to avoid pre-recording of the individual speaking such words or phrases or other reasons), and the audio recording may be processed by a voice identification subsystem to identify the speaker in the audio recording (e.g., to identify the speaker as someone who is identified by the identification information). In some embodiments, the obtained information (on which the confirmation is based) may include one or more answers to one or more verification questions provided to the client device during the first connection. The questions may, for instance, be randomly generated (e.g., randomly selected from a set of questions) during the first connection and presented at the client device to solicit the answers from a user of the client device.

In an operation 608, signature verification of the digital signatures of the first and second certificates may be performed by using a same public key (corresponding to the private key) to verify the digital signatures of the first and second certificates. As an example, with respect to each certificate, the certificate may be associated with a message for which the digital signature of the certificate is provided (for verifying the integrity of the message). The digital signature of the certificate may include the corresponding public key, an encrypted hash (e.g., encrypted using the private key), hash function information (e.g., hash function identifier indicating the hash function used to hash the message), or other information. The message of the certificate may be provided as input to a particular hash function (e.g., the same hash function used to generate the original version of the encrypted hash of the digital signature) to generate a hash for verification. The encrypted hash of the certificate may be decrypted using the corresponding public key. If the verification hash matches the decrypted hash (e.g., they are the same), then the digital signature (and the certificate) may be determined to be valid. Operation 608 may be performed by a challenge verification subsystem that is the same as or similar to challenge verification subsystem 114, in accordance with one or more embodiments.

In an operation 610, information obtained from the client device via the second connection may be authenticated based on (i) the obtained confirmation via the first connection and (ii) the signature verification of the digital signatures of the first and second certificates obtained respectively via the first and second connections. Operation 610 may be performed by an authentication subsystem that is the same as or similar to authentication subsystem 118, in accordance with one or more embodiments.

Figure 6B:
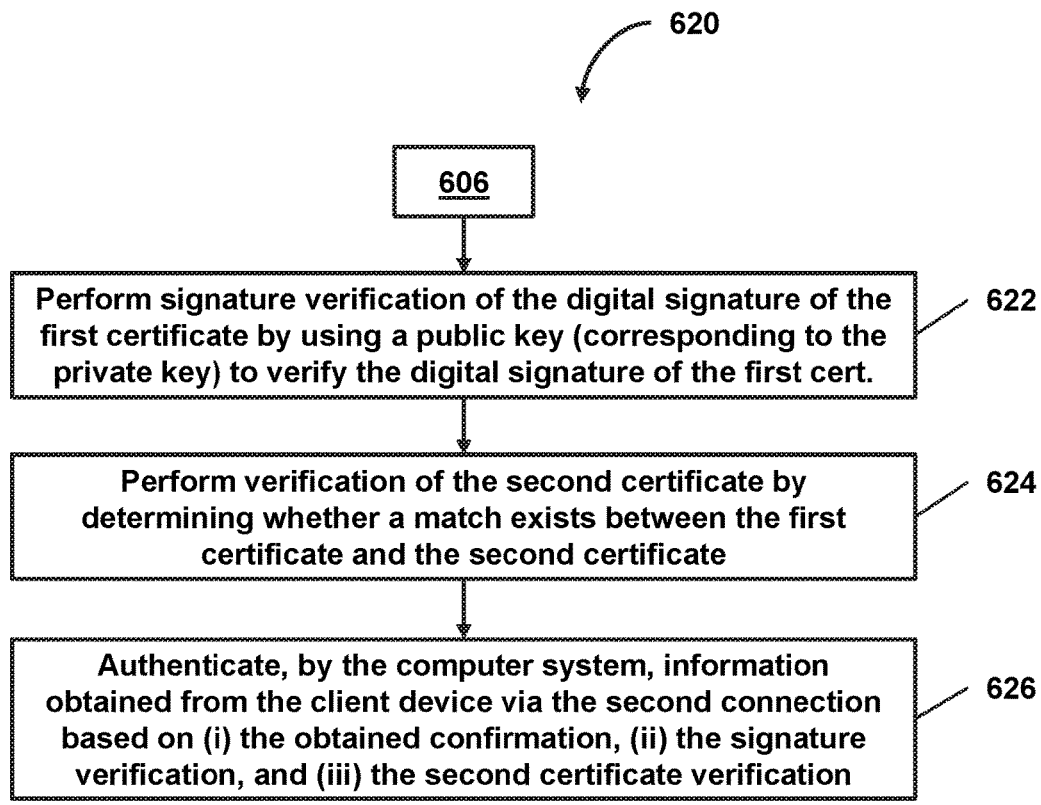

FIG. 6B shows a flowchart of a method 620 of facilitating authentication via same-key-generated certificate transmission over multiple connections, in accordance with one or more embodiments. In operations 602, 604, and 606, (i) first and second connections between a computer system and a client device may be established, (ii) first and second certificates may be obtained by the computer system from the client device respective via the first and second connections, and (iii) a confirmation of identification information associated with an entity, to which the private key corresponds, may be obtained by the computer system based on information obtained from the client device via the first connection.

In an operation 622, signature verification of the digital signature of the first certificate may be performed by using a public key (corresponding to the private key) to verify the digital signature of the first certificate. As an example, the first certificate may be associated with a message for which the digital signature of the certificate is provided (for verifying the integrity of the message). The digital signature of the certificate may include the corresponding public key, an encrypted hash (e.g., encrypted using the private key), hash function information (e.g., hash function identifier indicating the hash function used to hash the message), or other information. The message of the first certificate may be provided as input to a particular hash function (e.g., the same hash function used to generate the original version of the encrypted hash of the digital signature) to generate a hash for verification. The encrypted hash of the first certificate may be decrypted using the corresponding public key. If the verification hash matches the decrypted hash (e.g., they are the same), then the digital signature (and the certificate) may be determined to be valid. Operation 622 may be performed by a challenge verification subsystem that is the same as or similar to challenge verification subsystem 114, in accordance with one or more embodiments.

In an operation 624, verification of the second certificate may be performed. As an example, a determination of whether a match exists between the first certificate and the second certificate may be performed (e.g., whether they are the same) to verify whether the second certificate is a valid certificate. Operation 624 may be performed by a challenge verification subsystem that is the same as or similar to challenge verification subsystem 114, in accordance with one or more embodiments.

In an operation 626, information obtained from the client device via the second connection may be authenticated based on (i) the obtained confirmation via the first connection, (ii) the signature verification of the digital signature of the first certificate obtained via the first connection, and the (iii) the verification of the second certificate. Operation 626 may be performed by an authentication subsystem that is the same as or similar to authentication subsystem 118, in accordance with one or more embodiments.

Figure 7:
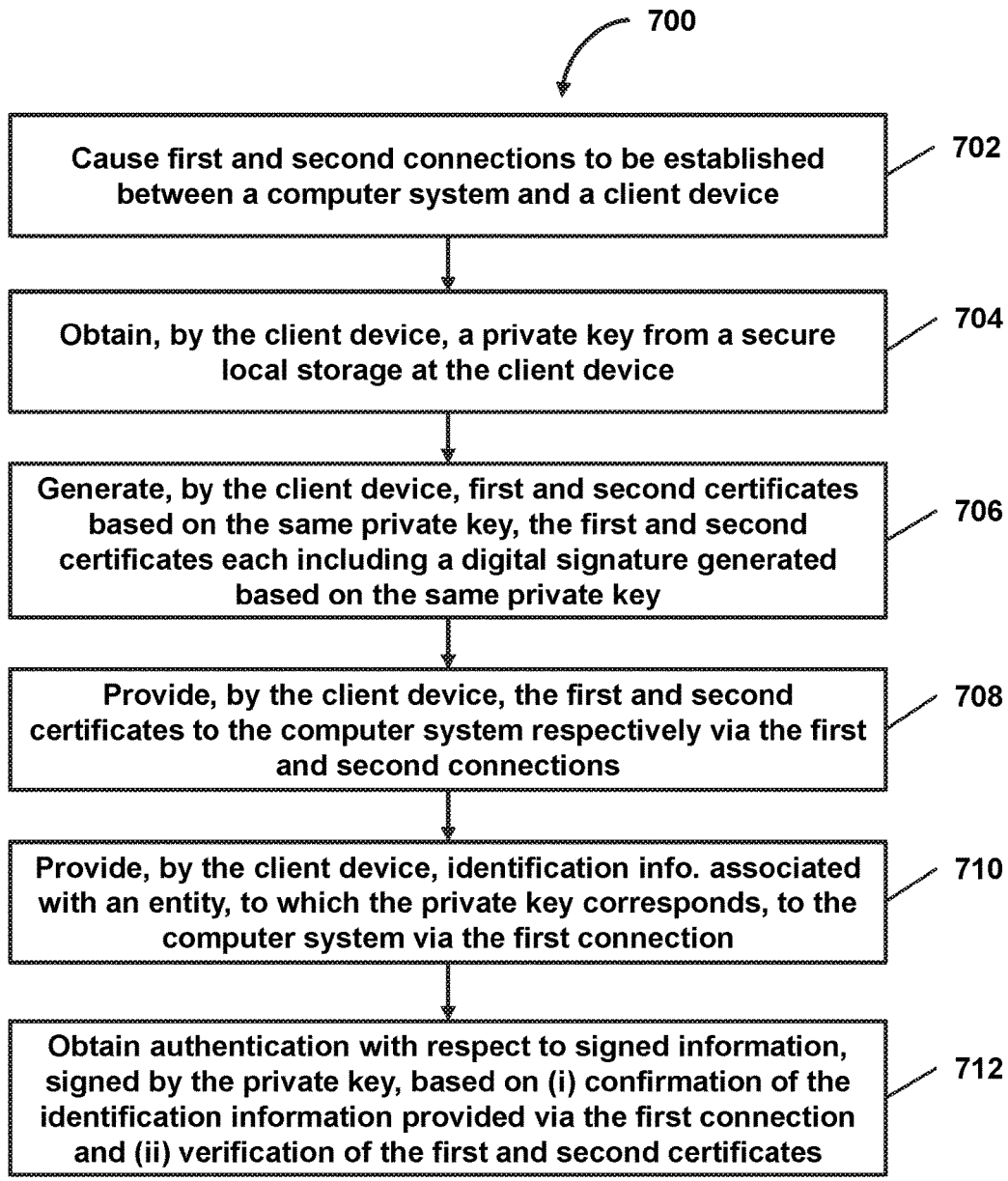
FIG. 7 shows a flowchart of another method of facilitating authentication via same-key-generated certificate transmission over multiple connections, in accordance with one or more embodiments.

FIG. 7 shows a flowchart of a method 700 of facilitating authentication via same-key-generated certificate transmission over multiple connections, in accordance with one or more embodiments. In an operation 702, first and second connections between a computer system and a client device may be established. In some embodiments, at least a portion of the first connection and a portion of the second connection overlap in time with one another. As an example, one of the connections may be initially established, and the other one of the connections may be established while the initially-established connection continues to be active or otherwise maintained between the computer system and the client device. In some embodiments, no portion of the first connection and the second connection overlaps in time with one another. As an example, one of the connections may be initially established, but then disconnected before the other one of the connections is established. Operation 702 may be performed by a client connection subsystem that is the same as or similar to client connection subsystem 122, in accordance with one or more embodiments.

In an operation 704, a private key may be obtained by the client device from a secure local storage at the client device. As an example, the private key may be stored in a secure memory within a cryptographic processor of the client device or other secure memory at the client device. In one use case, the private key may be stored in a volatile memory portion (of the client device's secure memory) that is associated with a client application hosted at the client device such that termination of the client application (e.g., closing the client application) or an active session thereof causes the private key and other information stored at the volatile memory portion associated with the client application to be overwritten (e.g., with random data or other data) or deleted. Operation 704 may be performed by a key management subsystem that is the same as or similar to key management subsystem 124, in accordance with one or more embodiments.

In an operation 706, first and second certificates may be generated by the client device based on the same private key such that the first and second certificates each include a digital signature generated based on the same private key. As an example, the first and second certificates may each be associated with (or, in some cases, include) a message signed using the private key to generate the digital signature of the respective certificate. Operation 706 may be performed by a client authentication subsystem that is the same as or similar to client authentication subsystem 126, in accordance with one or more embodiments.

In some embodiments, with respect to operation 706, the message of the first certificate may be provided as an input to a particular hash function to generate a first hash of the first certificate's message, the first hash may be encrypted using the private key, and the encrypted first hash may be combined with other information (e.g., a corresponding public key corresponding to the private key or other information) to generate the digital signature of the first certificate. The message of the second certificate may be provided as an input to the same hash function to generate a second hash of the second certificate's message, the second hash may be encrypted using the private key, and the encrypted second hash may be combined with other information (e.g., the same public key or other information) to generate the digital signature of the second certificate. In this way, for instance, each of the digital signatures may be verified by the computer system using the same public key. For example, with respect to each certificate, the message of the certificate may be provided as input to the same hash function to generate a hash for verification, and the encrypted hash of the certificate may be decrypted using the same public key. If the verification hash matches the decrypted hash (e.g., they are the same), then the digital signature (and the certificate) may be determined to be valid.

In an operation 708, the first and second certificates may be provided by the client device to the computer system respectively via the first and second connections. The first certificate may be provided by the client device to the computer system via the first connection at a first time. The second certificate may be provided by the client device to the computer system via the second connection at a second time. Operation 708 may be performed by a client authentication subsystem that is the same as or similar to client authentication subsystem 126, in accordance with one or more embodiments.

In an operation 710, identification information associated with an entity, to which the private key corresponds, may be provided by the client device to the computer system via the first connection. The identification information may include a name of the entity (e.g., a name of an individual or other entity), a social security number of the entity, a passport number of the entity, a tax identification number of the entity (e.g., a social security number, an organization tax identification number, etc.), a birth date of the entity, an address of the entity, a photo or other rendering of the entity (e.g., an image or video of the individual or other entity), or other identification information. Operation 710 may be performed by a client connection subsystem that is the same as or similar to client connection subsystem 122, in accordance with one or more embodiments.

In an operation 712, authentication with respect to signed information (signed using the private key) may be obtained based on (i) confirmation of the identification information provided (by the client device to the computer system) via the first connection and (ii) verification of the first and second certificates. As an example, based on the confirmation and the certificate verification, information signed using the private key (used to generate the digital signatures) and provided to the computer system may be authenticated as coming from the entity (to which the private key corresponds). Operation 712 may be performed by an authentication subsystem that is the same as or similar to authentication subsystem 118, in accordance with one or more embodiments.

In some embodiments, the various computers and subsystems illustrated in FIG. 1 may include one or more computing devices that are programmed to perform the functions described herein. The computing devices may include one or more electronic storages (e.g., verification database(s) 132 or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-128 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-128 described herein is for illustrative purposes, and is not intended to be limiting, as any of subsystems 112-128 may provide more or less functionality than is described. For example, one or more of subsystems 112-128 may be eliminated, and some or all of its functionality may be provided by other ones of subsystems 112-128. As another example, additional subsystems may be programmed to perform some or all of the functionality attributed herein to one of subsystems 112-128.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

A1. A method of facilitating multi-connection-based authentication, the method being implemented by a computer device that comprises one or more processors executing computer program instructions that, when executed, perform the method, the method comprising: causing, by the computer system, first and second connections to be established between the computer system and a remote client device; obtaining, by the computer system, a first challenge response from the remote client device via the first connection and a second challenge response from the remote client device via the second connection, the first and second challenge responses each being generated based on a same private key stored in a secure local storage at the remote client device; obtaining, by the computer system, a public key corresponding to the private key from the remote client device via the first connection; obtaining, by the computer system, a confirmation of identification information associated with an entity, to which the private key corresponds, based on information obtained from the remote client device via the first connection; and authenticating, by the computer system, information obtained from the remote client device via the second connection based on (i) the obtained confirmation via the first connection and (ii) verification of the first and second challenge responses obtained respectively via the first and second connections.

A2. The method of embodiment A1, further comprising: performing public-key-based verification of the first and second challenge responses by using the public key to verify at least a portion of each of the first and second challenge responses, wherein authenticating the obtained information comprises authenticating the obtained information based on (i) the obtained confirmation via the first connection and (ii) the public-key-based verification of the first and second challenge responses obtained respectively via the first and second connections.

A3. The method of any one of embodiments A1-A2, wherein each of the first and second challenge responses comprises a digital signature generated based on the same private key stored in the secure local storage at the remote client device, the method further comprising: performing, by the computer system, signature verification of the digital signature of the first challenge response and the digital signature of the second challenge response by using the public key to verify the digital signatures, wherein authenticating the obtained information comprises authenticating the obtained information based on (i) the obtained confirmation via the first connection and (ii) the signature verification of the digital signatures of the first and second challenge responses obtained respectively via the first and second connections.

A4. The method of embodiment A3, wherein the digital signature of the first challenge response and the digital signature of the second challenge response are different from one another.

A5. The method of any one of embodiments A1-A4, further comprising: performing, by the computer system, public-key-based verification of the first challenge response by using the public key to verify at least a portion of the first challenge response; registering, by the computer system, the public key in a database in association with the entity based on (i) the obtained confirmation via the first connection and (ii) the public-key-based verification of the first challenge response obtained via the first connection; obtaining, by the computer system, an identifier associated with the entity from the remote client device via the second connection; determining, by the computer system, a match between the associated identifier and at least one identifier registered in association with the entity in a database; and performing, by the computer system, based on the matching, public-key-based verification of the second challenge response by using the public key to verify at least a portion of the second challenge response, wherein authenticating the obtained information comprises authenticating the obtained information based on the public-key-based verification of the second challenge response obtained via the second connection.

A6. The method of any one of embodiments A1-A4, further comprising: performing, by the computer system, based on the matching, public-key-based verification of the first challenge response by using the public key to verify at least a portion of the first challenge response; registering, by the computer system, the public key in a database in association with the entity based on (i) the obtained confirmation via the first connection and (ii) the public-key-based verification of the first challenge response obtained via the first connection;

obtaining, by the computer system, a public key candidate from the remote client device via the second connection; determining, by the computer system, a match between the public key candidate and the public key stored in the database; and performing, by the computer system, based on the matching, public-key-based verification of the second challenge response by using the public key to verify at least a portion of the second challenge response, wherein authenticating the obtained information comprises authenticating the obtained information based on the public-key-based verification of the second challenge response obtained via the second connection.

A7. The method of any one of embodiments A1-A6, wherein causing the first and second connections to be established comprises causing the first and second connections to be established between the remote client device and the computer system such that at least a portion of the first connection and a portion of the second connection overlap in time with one another.

A8. The method of any one of embodiments A1-A6, wherein the first and second connections do not overlap in time with one another.

A9. The method of any one of embodiments A1-A8, wherein the first connection comprises a video connection, and wherein the information obtained via the first connection comprises a video of an individual associated with the identification information.

A10. A method of facilitating multi-connection-based authentication, the method being implemented by a client device that comprises one or more processors executing computer program instructions that, when executed, perform the method, the method comprising: causing, by the client device, first and second connections to be established between the client device and a remote computer system; obtaining, by the client device, a private key from a secure local storage at the client device; generating, by the client device, first and second challenge responses based on the private key; and providing, by the client device, the first challenge response to the remote computer system via the first connection and the second challenge response to the remote computer system via the second connection, wherein confirmation of identifying information associated with an entity, to which the private key corresponds, is obtained based on information provided to the remote computer system via the first connection, and wherein information provided to the remote computer system via the second connection is authenticated by the remote computer system based on (i) the obtained confirmation via the first connection and (ii) verification of the first and second challenge responses.

A11. The method of embodiment A10, wherein the verification of the first and second challenge responses comprises use of the public key to verify at least a portion of each of the first and second challenge responses.

A12. The method of any one of embodiments A10-A11, wherein each of the first and second challenge responses comprises a digital signature generated based on the private key stored in the secure local storage at the client device, and wherein the verification of the first and second challenge responses comprises (i) signature verification of the digital signature of the first challenge response and (ii) signature verification of the digital signature of the second challenge response.

A13. The method of embodiment A12, wherein the digital signature of the first challenge response and the digital signature of the second challenge response are different from one another.

A14. The method of any one of embodiments A10-A13, wherein the first connection comprises a video connection, and wherein the information obtained via the first connection comprises a video of an individual associated with the identification information.

A15. A tangible, non-transitory, machine-readable medium storing instructions that when executed by a data processing apparatus cause the data processing apparatus to perform operations comprising those of any of embodiments A1-A14.

A16. A system, comprising: one or more processors; and memory storing instructions that when executed by the processors cause the processors to effectuate operations comprising those of any of embodiments A1-A14.

B1. A method comprising: causing, by a computer system, first and second connections to be established between the computer system and a remote client device; obtaining, by the computer system, a first certificate from the remote client device via the first connection and a second certificate from the remote client device via the second connection, the first and second certificates each being generated based on a same private key stored in a secure local storage at the remote client device, and each of the first and second certificates comprising a digital signature generated based on the same private key; obtaining, by the computer system, a confirmation of identification information associated with an entity, to which the private key corresponds, based on information obtained from the remote client device via the first connection; obtaining, by the computer system, a confirmation of identification information associated with an entity, to which the private key corresponds, based on information obtained from the remote client device via the first connection; and authenticating, by the computer system, information obtained from the remote client device via the second connection based on (i) the obtained confirmation via the first connection and (ii) verification of the first and second certificates obtained respectively via the first and second connections.

B2. The method of embodiment B1, further comprising: performing, by the computer system, signature verification of the digital signature of the first certificate and the digital signature of the second certificate by using a public key corresponding to the private key to verify the digital signatures, wherein authenticating the obtained information comprises authenticating the obtained information based on (i) the obtained confirmation via the first connection and (ii) the signature verification of the digital signatures of the first and second certificates obtained respectively via the first and second connections.

B3. The method of embodiment B1, further comprising: performing, by the computer system, signature verification of the digital signature of the first certificate by using a public key corresponding to the private key to verify the digital signature of the first certificate; and performing, by the computer system, verification of the second certificate by determining whether a match exists between the first certificate and the second certificate, wherein authenticating the obtained information comprises authenticating the obtained information based on (i) the obtained confirmation via the first connection, (ii) the signature verification of the digital signature of the first certificate obtained via the first connection, and (iii) the verification of the second certification.

B4. The method of any one of embodiments B1-B3, wherein the information obtained via the second connection comprises a message included in the second certificate.

B5. The method of any one of embodiments B1-B4, wherein the information obtained via the second connection comprises one or more messages separate from the second certificate.

B6. The method of any one of embodiments B1-B5, wherein causing the first and second connections to be established comprises causing the first and second connections to be established between the remote client device and the computer system such that at least a portion of the first connection and a portion of the second connection overlap in time with one another.

B7. The method of any one of embodiments B1-B5 wherein the first and second connections do not overlap in time with one another.

B8. The method of any one of embodiments B1-B7 wherein the digital signature of the first certificate and the digital signature of the second certificate are different from one another.

B9. The method of any one of embodiments B1-B8, wherein the first connection comprises a video connection or an audio connection, and wherein the information obtained via the first connection comprises a video or audio of an individual associated with the identification information.

B10. A method comprising: causing, by a client device, first and second connections to be established between the client device and a remote computer system; obtaining, by the client device, a private key from a secure local storage at the client device; generating, by the client device, first and second certificates based on the private key, the first and second certificates each comprising a digital signature generated based on the private key; and providing, by the client device, the first certificate to the remote computer system via the first connection and the second certificate to the remote computer system via the second connection, wherein confirmation of identifying information associated with an entity, to which the private key corresponds, is obtained based on information provided to the remote computer system via the first connection, and wherein information provided to the remote computer system via the second connection is authenticated by the remote computer system based on (i) the obtained confirmation via the first connection and (ii) verification of the first and second certificates.

B11. The method of embodiment B10, wherein the verification of the first and second certificates comprises signature verification of the digital signatures of the first and second certificates.

B12. The method of embodiment B10, wherein the verification of the first and second certificates comprises (i) signature verification of the digital signature of the first certificate and (ii) a determination of whether a match exists between the first certificate and the second certificate.

B13. The method of any one of embodiments B10-B12, wherein the information provided via the second connection comprises a message included in the second certificate.

B14. The method of any one of embodiments B10-B13, wherein the information provided via the second connection comprises one or more messages separate from the second certificate.

B15. The method of any one of embodiments B10-B14, wherein causing the first and second connections to be established comprises causing the first and second connections to be established between the client device and the remote computer system such that at least a portion of the first connection and a portion of the second connection overlap in time with one another.

B16. The method of any one of embodiments B10-B14, wherein the first and second connections do not overlap in time with one another.

B17. The method of any one of embodiments B10-B16, wherein the digital signature of the first certificate and the digital signature of the second certificate are different from one another.

B18. The method of any one of embodiments B10-B17, wherein the first connection comprises a video connection or an audio connection, and wherein the information obtained via the first connection comprises a video or audio of an individual associated with the identification information.

B19. A tangible, non-transitory, machine-readable medium storing instructions that when executed by a data processing apparatus cause the data processing apparatus to perform operations comprising those of any of embodiments B1-B18.

B20. A system, comprising: one or more processors; and memory storing instructions that when executed by the processors cause the processors to effectuate operations comprising those of any of embodiments B1-B18.

What is claimed is:

1. A method of facilitating multi-connection-based authentication, the method being implemented by a computer system that comprises one or more processors executing computer program instructions that, when executed, perform the method, the method comprising:

causing, by the computer system, first and second connections to be established between the computer system and a remote client device;

obtaining, by the computer system, a first challenge response from the remote client device via the first connection and a second challenge response from the remote client device via the second connection, the first and second challenge responses each being generated based on a same private key stored in a secure local storage at the remote client device;

obtaining, by the computer system, a public key corresponding to the private key from the remote client device via the first connection;

performing, by the computer system, public-key-based verification of the first challenge response by using the public key to verify at least a portion of the first challenge response;

obtaining, by the computer system, a confirmation of identification information associated with an entity, to which the private key corresponds, based on information obtained from the remote client device via the first connection;

registering, by the computer system, the public key in a database in association with the entity based on (i) the obtained confirmation via the first connection and (ii) the public-key-based verification of the first challenge response obtained via the first connection;

obtaining, by the computer system, an identifier associated with the entity from the remote client device via the second connection;

determining, by the computer system, a match between the associated identifier and at least one identifier registered in association with the entity in a database;

performing, by the computer system, based on the matching, public-key-based verification of the second challenge response by using the public key to verify at least a portion of the second challenge response; and authenticating, by the computer system, information obtained from the remote client device via the second connection based on the public-key-based verification of the second challenge response obtained via the second connection.

2. The method of claim 1, wherein one of the first and second connections is a video streaming connection, and the other one of the first and second connections is a non-video-streaming connection that is not a video connection.

3. The method of claim 1, wherein each of the first and second challenge responses comprises a digital signature generated based on the same private key stored in the secure local storage at the remote client device,
wherein performing the public-key-based verification of the first challenge response comprises performing, by the computer system, signature verification of the digital signature of the first challenge response by using the public key to verify the digital signature of the first challenge response, and
wherein performing the public-key-based verification of the second challenge response comprises performing, by the computer system, signature verification of the digital signature of the second challenge response by using the public key to verify the digital signature of the second challenge response.

4. The method of claim 3, wherein the digital signature of the first challenge response and the digital signature of the second challenge response are different from one another.

5. The method of claim 1, wherein causing the first and second connections to be established comprises causing the first and second connections to be established between the remote client device and the computer system such that the first connection is active during a time that the second connection is active.

6. The method of claim 1, wherein causing the first and second connections to be established comprises causing the first and second connections to be established between a client application at the remote client device and the computer system such that (i) the first and second connections do not overlap in time with one another and (ii) the first and second connections are established during a same application session of the client application.

7. The method of claim 1, wherein the first connection comprises a video streaming connection, and wherein the information obtained via the first connection comprises a video of an individual associated with the identification information.

8. A system for facilitating multi-connection-based authentication, the system comprising:
a computer system that comprises one or more processors programmed with computer program instructions that, when executed, cause the computer system to:
cause first and second connections to be established between the computer system and a remote client device;
obtain a first challenge response from the remote client device via the first connection and a second challenge response from the remote client device via the second connection, the first and second challenge responses each being generated based on a same private key stored in a secure local storage at the remote client device;
obtain a public key corresponding to the private key from the remote client device via the first connection;
perform public-key-based verification of the first challenge response by using the public key to verify at least a portion of the first challenge response;
obtain a confirmation of identification information associated with an entity, to which the private key corresponds, based on information obtained from the remote client device via the first connection;
register the public key in a database in association with the entity based on (i) the obtained confirmation via the first connection and (ii) the public-key-based verification of the first challenge response obtained via the first connection;
obtain an identifier associated with the entity from the remote client device via the second connection;
determine a match between the associated identifier and at least one identifier registered in association with the entity in a database;
perform, based on the matching, public-key-based verification of the second challenge response by using the public key to verify at least a portion of the second challenge response; and
authenticate information obtained from the remote client device via the second connection based on the public-key-based verification of the second challenge response obtained via the second connection.

9. The system of claim 8, wherein one of the first and second connections is a video streaming connection, and the other one of the first and second connections is a non-video-streaming connection that is not a video connection.

10. The system of claim 8, wherein each of the first and second challenge responses comprises a digital signature generated based on the same private key stored in the secure local storage at the remote client device, and
wherein performing the public-key-based verification of the first challenge response comprises performing signature verification of the digital signature of the first challenge response by using the public key to verify the digital signature of the first challenge response, and
wherein performing the public-key-based verification of the second challenge response comprises performing, by the computer system, signature verification of the digital signature of the second challenge response by using the public key to verify the digital signature of the second challenge response, the digital signature of the first challenge response and the digital signature of the second challenge response being different from one another.

11. The system of claim 8, wherein causing the first and second connections to be established comprises causing the first and second connections to be established between the remote client device and the computer system such that the first connection is active during a time that the second connection is active.

12. The system of claim 8, wherein causing the first and second connections to be established comprises causing the first and second connections to be established between a client application at the remote client device and the computer system such that (i) the first and second connections do not overlap in time with one another and (ii) the first and second connections are established during a same application session of the client application.

13. The system of claim 8, wherein the first connection comprises a video streaming connection, and wherein the information obtained via the first connection comprises a video of an individual associated with the identification information.

14. A method implemented by a computer system that comprises one or more processors executing computer program instructions that, when executed, perform the method, the method comprising:

causing, by the computer system, first and second connections to be established between the computer system and a remote client device;

obtaining, by the computer system, a first challenge response from the remote client device via the first connection and a second challenge response from the remote client device via the second connection, the first and second challenge responses each being generated based on a same private key stored in a secure local storage at the remote client device;

obtaining, by the computer system, a public key corresponding to the private key from the remote client device via the first connection;

performing, by the computer system, public-key-based verification of the first challenge response by using the public key to verify at least a portion of the first challenge response;

obtaining, by the computer system, a confirmation of identification information associated with an entity, to which the private key corresponds, based on information obtained from the remote client device via the first connection;

registering, by the computer system, the public key in a database in association with the entity based on (i) the obtained confirmation via the first connection and (ii) the public-key-based verification of the first challenge response obtained via the first connection;

obtaining, by the computer system, a public key candidate from the remote client device via the second connection;

determining, by the computer system, a match between the public key candidate and the public key stored in the database; and performing, by the computer system, based on the matching, public-key-based verification of the second challenge response by using the public key to verify at least a portion of the second challenge response, authenticating, by the computer system, information obtained from the remote client device via the second connection based on the public-key-based verification of the second challenge response obtained via the second connection.

15. The method of claim 14, wherein causing the first and second connections to be established comprises causing the first and second connections to be established between the remote client device and the computer system such that the first connection is active during a time that the second connection is active.

16. The method of claim 14, wherein causing the first and second connections to be established comprises causing the first and second connections to be established between a client application at the remote client device and the computer system such that (i) the first and second connections do not overlap in time with one another and (ii) the first and second connections are established during a same application session of the client application.

17. The method of claim 14, wherein the first connection comprises a video streaming connection, and wherein the information obtained via the first connection comprises a video of an individual associated with the identification information.

18. A system comprising:
a computer system that comprises one or more processors programmed with computer program instructions that, when executed, cause the computer system to:
cause first and second connections to be established between the computer system and a remote client device;
obtain a first challenge response from the remote client device via the first connection and a second challenge response from the remote client device via the second connection, the first and second challenge responses each being generated based on a same private key stored in a secure local storage at the remote client device;
obtain a public key corresponding to the private key from the remote client device via the first connection;
perform public-key-based verification of the first challenge response by using the public key to verify at least a portion of the first challenge response;
obtain a confirmation of identification information associated with an entity, to which the private key corresponds, based on information obtained from the remote client device via the first connection;
register the public key in a database in association with the entity based on (i) the obtained confirmation via the first connection and (ii) the public-key-based verification of the first challenge response obtained via the first connection;
obtain a public key candidate from the remote client device via the second connection;
determine a match between the public key candidate and the public key stored in the database;
perform, based on the matching, public-key-based verification of the second challenge response by using the public key to verify at least a portion of the second challenge response; and
authenticate information obtained from the remote client device via the second connection based on the public-key-based verification of the second challenge response obtained via the second connection.

19. The system of claim 18, wherein causing the first and second connections to be established comprises causing the first and second connections to be established between the remote client device and the computer system such that the first connection is active during a time that the second connection is active.

20. The system of claim 18, wherein causing the first and second connections to be established comprises causing the first and second connections to be established between a client application at the remote client device and the computer system such that (i) the first and second connections do not overlap in time with one another and (ii) the first and second connections are established during a same application session of the client application.

* * * * *